United States Patent
Hasegawa et al.

(10) Patent No.: US 9,435,040 B2
(45) Date of Patent: Sep. 6, 2016

(54) WATER ELECTROLYSIS SYSTEM

(71) Applicant: NISSAN MOTOR CO., LTD., Yokohama-shi, Kanagawa (JP)

(72) Inventors: Takuya Hasegawa, Yokohama (JP); Ryuji Fujieda, Zushi (JP)

(73) Assignee: Nissan Motor Co., Ltd., Yokohama-Shi, Kanagawa (JP)

( * ) Notice: Subject to any disclaimer, the term of this patent is extended or adjusted under 35 U.S.C. 154(b) by 0 days.

(21) Appl. No.: 14/410,314

(22) PCT Filed: Jun. 25, 2013

(86) PCT No.: PCT/JP2013/067341
§ 371 (c)(1),
(2) Date: Dec. 22, 2014

(87) PCT Pub. No.: WO2014/002988
PCT Pub. Date: Jan. 3, 2014

(65) Prior Publication Data
US 2015/0337445 A1    Nov. 26, 2015

(30) Foreign Application Priority Data

Jun. 25, 2012 (JP) ................................. 2012-142138

(51) Int. Cl.
| | |
|---|---|
| C25B 9/06 | (2006.01) |
| C25B 1/04 | (2006.01) |
| C25B 9/00 | (2006.01) |
| C25B 15/08 | (2006.01) |
| B01D 53/26 | (2006.01) |

(52) U.S. Cl.
CPC . *C25B 9/06* (2013.01); *C25B 1/04* (2013.01); *C25B 9/00* (2013.01); *C25B 15/08* (2013.01); *B01D 53/261* (2013.01); *B01D 2256/16* (2013.01); *B01D 2259/402* (2013.01); *Y02E 60/366* (2013.01)

(58) Field of Classification Search
None
See application file for complete search history.

(56) References Cited

U.S. PATENT DOCUMENTS

| | | | | |
|---|---|---|---|---|
| 4,085,709 A | * | 4/1978 | Tangri | F02B 43/10 123/1 A |
| 4,822,469 A | * | 4/1989 | Shimomura | C25B 15/02 204/228.5 |
| 5,254,154 A | * | 10/1993 | Gauthier | B01D 53/047 95/100 |
| 5,484,512 A | * | 1/1996 | Sasaki | C01B 3/56 204/232 |
| 5,796,799 A | * | 8/1998 | Kobayashi | C25B 1/10 204/263 |
| 2003/0006136 A1 | | 1/2003 | Hiki et al. | |

(Continued)

FOREIGN PATENT DOCUMENTS

| | | |
|---|---|---|
| CN | 1171287 A | 1/1998 |
| JP | 05-123525 A | 5/1993 |

(Continued)

*Primary Examiner* — Harry D Wilkins, III
(74) *Attorney, Agent, or Firm* — Young Basile Hanlon & MacFarlane, P.C.

(57) ABSTRACT

A water electrolysis system includes a water electrolysis stack that electrolyzes water and generates hydrogen, a dehumidification device that adsorbs and removes moisture contained in the hydrogen generated by the water electrolysis stack, a wet line that supplies the hydrogen generated by the water electrolysis stack to the dehumidification device, a compression device that gradually increases pressure of the hydrogen whose moisture is removed in the dehumidification device, and a purge line that takes out a part of the hydrogen whose pressure is being increased, in the compression device, allows it to pass through the dehumidification device, and allows it to join the wet line.

6 Claims, 4 Drawing Sheets

(56) References Cited

U.S. PATENT DOCUMENTS

| | | | |
|---|---|---|---|
| 2005/0000802 A1* | 1/2005 | Hobbs | C01B 3/34 204/277 |
| 2005/0115825 A1* | 6/2005 | Frank | C25B 9/06 204/253 |
| 2009/0272264 A1 | 11/2009 | Lim et al. | |

FOREIGN PATENT DOCUMENTS

| | | |
|---|---|---|
| JP | 2006-299322 A | 11/2006 |
| JP | 2007-231383 A | 9/2007 |
| JP | 2008-144254 A | 6/2008 |
| JP | 2010-043301 A | 2/2010 |

* cited by examiner

WATER ELECTROLYSIS SYSTEM

CROSS REFERENCE TO RELATED APPLICATION

The present application claims priority to Japanese Patent Application No. 2012-142138 filed in the Japan Patent Office on Jun. 25, 2012. The contents of this application are incorporated herein by reference in their entirety.

TECHNICAL FIELD

The present invention relates to a water electrolysis system.

BACKGROUND ART

According to the conventional water electrolysis system as described in JP 2010-43301 A, hydrogen generated by electrolyzing water is dehumidified alternately by two adsorption cylinders. When one of the adsorption cylinders is renewed, a part of the hydrogen dehumidified by the other adsorption cylinder, is introduced into the one adsorption cylinder so as to renew the one adsorption cylinder.

Further, according to the conventional water electrolysis system as described in JP 2007-231383 A, hydrogen discharged from a water electrolysis stack for generating high pressure hydrogen is stored in a hydrogen tank after its moisture is removed by an adsorption unit and, when the adsorption unit is renewed, the hydrogen in the hydrogen tank is fed to the adsorption unit after its pressure is reduced, so as to renew the adsorption unit.

SUMMARY OF INVENTION

However, according to the conventional water electrolysis system as described in JP 2010-43301A, the pressure of the hydrogen that is introduced into the adsorption cylinder for renewal is lower than the pressure of the hydrogen that is introduced into the adsorption cylinder for dehumidification. Therefore, the hydrogen used for renewing the adsorption cylinder cannot be circulated. This causes such a problem that the hydrogen used for renewing the adsorption cylinder has to be discharged to the outside of the water electrolysis system as it cannot be reused.

Further, according to the conventional water electrolysis system as described in JP 2007-231383A, the hydrogen whose pressure is reduced after being temporarily increased, is fed to the adsorption unit, when renewing the adsorption unit. This causes such a problem that an energy loss is increased accordingly.

The present invention is made in view of these problems, and its object is to provide a water electrolysis system capable of reducing an energy loss and of reusing hydrogen used for renewing an adsorption cylinder.

A water electrolysis system according to an aspect of the present invention includes a water electrolysis stack that electrolyzes water and generates hydrogen, a dehumidification device that adsorbs and removes moisture contained in the hydrogen generated by the water electrolysis stack, and a wet line that supplies the hydrogen generated by the water electrolysis stack to the dehumidification device. The water electrolysis system further includes a compression device that gradually increases pressure of the hydrogen whose moisture is removed in the dehumidification device, and a purge line that takes out a part of the hydrogen whose pressure is being increased, in the compression device, allows it to pass through the dehumidification device, and allows it to join the wet line.

Embodiments and advantages of the present invention will be explained in detail with reference to the attached drawings.

DESCRIPTION OF EMBODIMENTS

Figure 1:
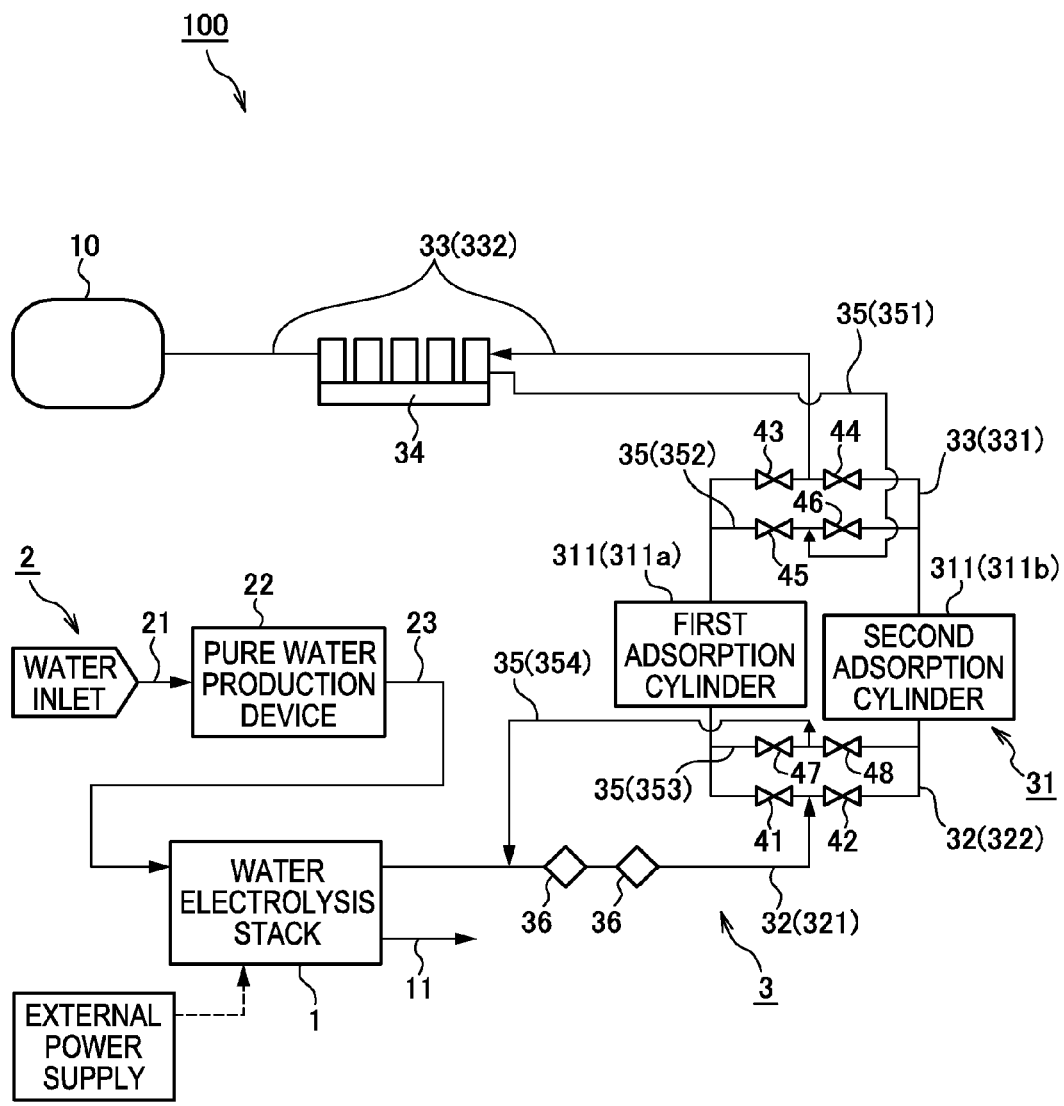
FIG. 1 is a schematic block diagram of a water electrolysis system according to an embodiment of the present invention.

FIG. 1 is a schematic block diagram of a water electrolysis system 100 according to an embodiment of the present invention.

The water electrolysis system 100 is a system for supplying hydrogen generated by electrolyzing pure water to a hydrogen tank 10. The water electrolysis system 100 is provided with a water electrolysis stack 1, a pure water supply unit 2 that supplies pure water to the water electrolysis stack 1, and a hydrogen supply unit 3 that dehumidifies and increases the pressure of the hydrogen, generated in the water electrolysis stack 1, and supplies it to the hydrogen tank 10.

The water electrolysis stack 1, in which a plurality of water electrolysis cells are laminated, is configured to be electrically connectable to an external power supply. The water electrolysis stack 1 uses power of the external power supply to electrolyze pure water and to generate hydrogen and oxygen. The oxygen generated in the water electrolysis stack 1 and the used pure water are discharged, via a discharge passage 11, to the outside of the water electrolysis system 100.

The pure water supply unit 2 is provided with a water passage 21, a pure water production device 22, and a pure water passage 23.

The water passage 21 is a passage for supplying water such as tap water and industrial water to the pure water production device 22. One end of the water passage 21 is configured to be connectable to a water inlet, and the other end is connected to the pure water production device 22.

The pure water production device 22 produces pure water from water.

The pure water passage 23 is a passage for supplying the pure water produced in the pure water production device 22 to the water electrolysis stack 1. One end of the pure water passage 23 is connected to the pure water production device 22, and the other end is connected to the water electrolysis stack 1.

The hydrogen supply unit 3 is provided with a dehumidification device 31, a wet line 32, a dry line 33, a compression device 34, and a purge line 35.

The dehumidification device 31 is provided with two adsorption cylinders 311, each of which includes a heater and a moisture adsorbent in its inside. When it is particularly required to distinguish between the two adsorption cylinders 311 in the following explanation, the adsorption cylinder on the left side in the drawing is referred to as a "first adsorption cylinder 311a", and the adsorption cylinder on the right side in the drawing is referred to as a "second adsorption cylinder 311b".

Each of the adsorption cylinders 311 is open at both ends. Moisture of gas, flowing in from one of the open ends, is adsorbed by a moisture adsorbent, and is discharged from the other open end. When an amount of the moisture adsorbed on the moisture adsorbent of each adsorption cylinder 311 becomes permissible or more, the adsorption cylinder 311 can be renewed by, after stopping the supply of the gas containing the moisture, heat-desorbing the moisture from the moisture adsorbent by the heater, introducing dry gas into the adsorption cylinder 311, and discharging (purging) the desorbed moisture to the outside of the adsorption cylinder 311.

The dehumidification device 31 generally uses such characteristics of the adsorption cylinders 311, and repeats the moisture adsorption and desorption (renewal) alternately in the first adsorption cylinder 311a and the second adsorption cylinder 311b. Namely, the hydrogen containing the moisture (hereinafter referred to as "wet hydrogen") generated in the water electrolysis stack 1 is dehumidified in one of the adsorption cylinders 311, and a part of the dried hydrogen (hereinafter referred to as "dry hydrogen"), discharged from the one adsorption cylinder 311, is introduced into the other adsorption cylinder 311, so as to renew the other adsorption cylinder 311.

For this reason, the dehumidification device 31 is provided with the wet line 32 for introducing the wet hydrogen selectively into the first adsorption cylinder 311a and the second adsorption cylinder 311b, the dry line 33 for introducing the dry hydrogen which is dried selectively in the first adsorption cylinder 311a or the second adsorption cylinder 311b, into the hydrogen tank 10, and the purge line 35 for introducing the dry hydrogen into the adsorption cylinder 311 as dry gas for renewing the adsorption cylinder (hereinafter referred to as "purge hydrogen") and returning it to the wet line 32 for circulation.

The wet line 32 is formed by a wet hydrogen passage 321 and a wet hydrogen introduction passage 322.

The wet hydrogen passage 321 is a passage through which the wet hydrogen, generated in the water electrolysis stack 1, flows. One end of the wet hydrogen passage 321 is connected to the water electrolysis stack 1, and the other end is connected to the wet hydrogen introduction passage 322. In order to reduce a load of the adsorption cylinders 311, it is preferable that an auto drain (liquid discharge device) 36 for automatically discharging liquid water in the passage to the outside of the passage is provided on the wet hydrogen passage 321. There may be one or a plurality of auto drains 36 provided thereon.

The wet hydrogen introduction passage 322 is a passage that allows the wet hydrogen flowing through the wet hydrogen passage 321 to branch off and to be introduced to either the first adsorption cylinder 311a or the second adsorption cylinder 311b. A first valve 41 and a second valve 42 are provided on the wet hydrogen introduction passage 322, and the wet hydrogen passage 321 is connected between the first valve 41 and the second valve 42. Further, one end portion of the wet hydrogen introduction passage 322 is connected to the first adsorption cylinder 311a, and the other end portion is connected to the second adsorption cylinder 311b.

The dry line 33 is formed by a dry hydrogen discharge passage 331 and a dry hydrogen passage 332.

The dry hydrogen discharge passage 331 is a passage for introducing the dry hydrogen discharged from either the first adsorption cylinder 311a or the second adsorption cylinder 311b to the dry hydrogen passage 332. A third valve 43 and a fourth valve 44 are provided on the dry hydrogen discharge passage 331, and the dry hydrogen passage 332 is connected between the third valve 43 and the fourth valve 44. Further, one end portion of the dry hydrogen discharge passage 331 is connected to the first adsorption cylinder 311a, and the other end portion is connected to the second adsorption cylinder 311b.

The dry hydrogen passage 332 is a passage for supplying the dry hydrogen flowing through the dry hydrogen discharge passage 331 via the compression device 34 to the hydrogen tank 10. One end of the dry hydrogen passage 332 is connected to the dry hydrogen discharge passage 331, and the other end is connected to the hydrogen tank 10.

The compression device 34 is provided on the dry hydrogen passage 332. According to this embodiment, a multiple-stage reciprocating compressor, which divides and compresses the dry hydrogen flowing through the dry hydrogen passage 332 for a plurality of times, and forcibly feeds the dry hydrogen whose pressure is increased to desired pressure to the hydrogen tank 10, is used as the compression device 34, but this is not restrictive. Any type of compression device 34 may be used as the compression device 34, as long as a part of the dry hydrogen whose pressure is increased to the desired pressure can be taken out.

The purge line 35 is formed by a purge hydrogen supply passage 351, a purge hydrogen introduction passage 352, a purge hydrogen discharge passage 353, and a purge hydrogen circulation passage 354.

The purge hydrogen supply passage 351 is a passage for supplying the dry hydrogen, having the high pressure, as the purge hydrogen to the purge hydrogen introduction passage 352, by taking out a part of the dry hydrogen whose pressure is increased in the first-stage reciprocating compressor of the compression device 34. One end of the purge hydrogen supply passage 351 is connected to the first-stage reciprocating compressor of the compression device 34, and the other end is connected to the purge hydrogen introduction passage 352. It is noted that according to this embodiment, one end of the purge hydrogen supply passage 351 is connected to the first-stage reciprocating compressor of the compression device 34, and a part of the dry hydrogen whose pressure is increased in the first-stage reciprocating compressor, is taken out, but this is not restrictive. One end of the purge hydrogen supply passage 351 may be connected to the second-stage or the third-stage reciprocating compressor, for example.

The purge hydrogen introduction passage 352 is a passage for introducing the purge hydrogen flowing through the purge hydrogen supply passage 351 into the adsorption cylinder 311 that is being renewed. One end of the purge hydrogen introduction passage 352 is connected to the dry hydrogen discharge passage 331 between the first adsorption cylinder 311a and the third valve 43, and the other end is connected to the dry hydrogen discharge passage 331 between the second adsorption cylinder 311b and the fourth valve 44. A fifth valve 45 and a sixth valve 46 are provided on the purge hydrogen introduction passage 352, and the purge hydrogen supply passage 351 is connected between the fifth valve 45 and the sixth valve 46.

The purge hydrogen discharge passage 353 is a passage for introducing the purge hydrogen, discharged from the adsorption cylinder 311 that is being renewed, into the purge hydrogen circulation passage 354. One end of the purge hydrogen discharge passage 353 is connected to the wet hydrogen introduction passage 322 between the first adsorption cylinder 311a and the first valve 41, and the other end is connected to the wet hydrogen introduction passage 322 between the second adsorption cylinder 311b and the second valve 42. A seventh valve 47 and an eighth valve 48 are provided on the purge hydrogen discharge passage 353, and the purge hydrogen circulation passage 354 is connected between the seventh valve 47 and the eighth valve 48.

The purge hydrogen circulation passage 354 is a passage for returning the purge hydrogen discharged from the adsorption cylinder 311 that is being renewed into the wet hydrogen passage 321. One end of the purge hydrogen circulation passage 354 is connected to the purge hydrogen discharge passage 353 between the seventh valve 47 and the eighth valve 48, and the other end is connected to the wet hydrogen passage 321. When the auto drain 36 is provided on the wet hydrogen passage 321, it is preferable that the other end of the purge hydrogen circulation passage 354 is connected to the wet hydrogen passage 321 at the position upstream of the auto drain 36. The purge hydrogen flowing through the purge hydrogen circulation passage 354 is cooled by air flowing on the surface of the purge hydrogen circulation passage 354.

Next, the operation of the water electrolysis system 100 according to this embodiment will be explained with reference to FIG. 2 and FIG. 3.

Figure 2:
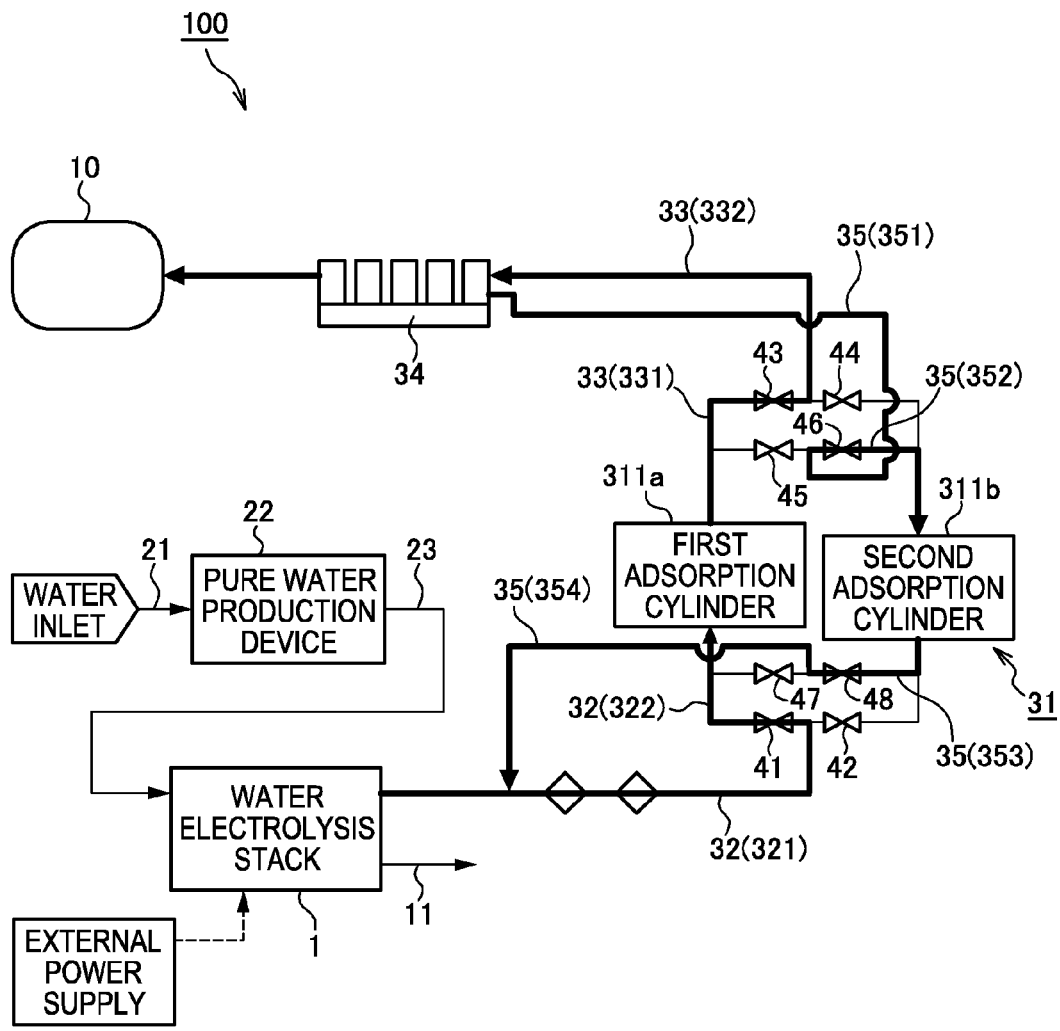
FIG. 2 is a drawing illustrating the flow of hydrogen when moisture of wet hydrogen is adsorbed by a first adsorption cylinder, and a second adsorption cylinder is renewed.

FIG. 2 is a drawing illustrating the flow of hydrogen when the moisture in the wet hydrogen is adsorbed by the first adsorption cylinder 311a, and the second adsorption cylinder 311b is renewed.

When tap water is supplied to the water passage 21, pure water that is produced by the pure water production device 22 is supplied to the water electrolysis stack 1. When the water electrolysis stack 1 is connected to the external power supply at this time, the pure water is electrolyzed by the power of the external power supply, and the water electrolysis stack 1 generates hydrogen and oxygen.

The wet hydrogen generated in the water electrolysis stack 1 is sent via the wet line 32 to the dehumidification device 31. Meanwhile, the oxygen generated in the water electrolysis stack 1 is discharged via the discharge passage 11 to the outside of the water electrolysis system 100, together with the used pure water.

When the moisture of the wet hydrogen is adsorbed by the first adsorption cylinder 311a and the second adsorption cylinder 311b is renewed as illustrated in FIG. 2, the first valve 41, the third valve 43, the sixth valve 46, and the eighth valve 48 are opened, and the second valve 42, the fourth valve 44, the fifth valve 45, and the seventh valve 47 are closed.

Thus, the wet hydrogen flowing through the wet hydrogen passage 321, passes through the wet hydrogen introduction passage 322 on the side where the first valve 41 is provided, as the first valve 41 is opened and the second valve 42 and the seventh valve 47 are closed, and introduced into the first adsorption cylinder 311a where the moisture is removed. Then, the dry hydrogen discharged from the first adsorption cylinder 311a passes through the dry hydrogen discharge passage 331 on the side where the third valve 43 is provided, as the third valve 43 is opened and the fourth valve 44 and the fifth valve 45 are closed, and is introduced into the dry hydrogen passage 332.

A part of the dry hydrogen supplied via the dry hydrogen passage 332 to the compression device 34 in which the pressure is increased in the first-stage reciprocating compressor, flows through the purge hydrogen supply passage 351 as the purge hydrogen, and is supplied to the purge hydrogen introduction passage 352. The dry hydrogen, supplied to the purge hydrogen introduction passage 352, passes through the purge hydrogen introduction passage 352 on the side where the sixth valve 46 is provided, as the sixth valve 46 is opened and the fourth valve 44 and the fifth valve 45 are closed, and is introduced into the second adsorption cylinder 311b that is being renewed. Thereby, the moisture that is heat-desorbed by the heater from the moisture adsorbent of the second adsorption cylinder 311b can be discharged to the outside of the second adsorption cylinder 311b, that is, to the purge hydrogen discharge passage 353, together with the purge hydrogen.

The purge hydrogen, discharged from the second adsorption cylinder 311b, passes through the purge hydrogen discharge passage 353 on the side where the eighth valve 48 is provided, as the eighth valve 48 is opened and the second valve 42 and the seventh valve 47 are closed, and is introduced into the purge hydrogen circulation passage 354. As a result of this, the purge hydrogen discharged from the second adsorption cylinder 311b, is returned to the wet hydrogen supply passage, together with the moisture that is heat-desorbed from the moisture adsorbent of the second adsorption cylinder 311b, and is introduced into the first adsorption cylinder 311a again.

Figure 3:
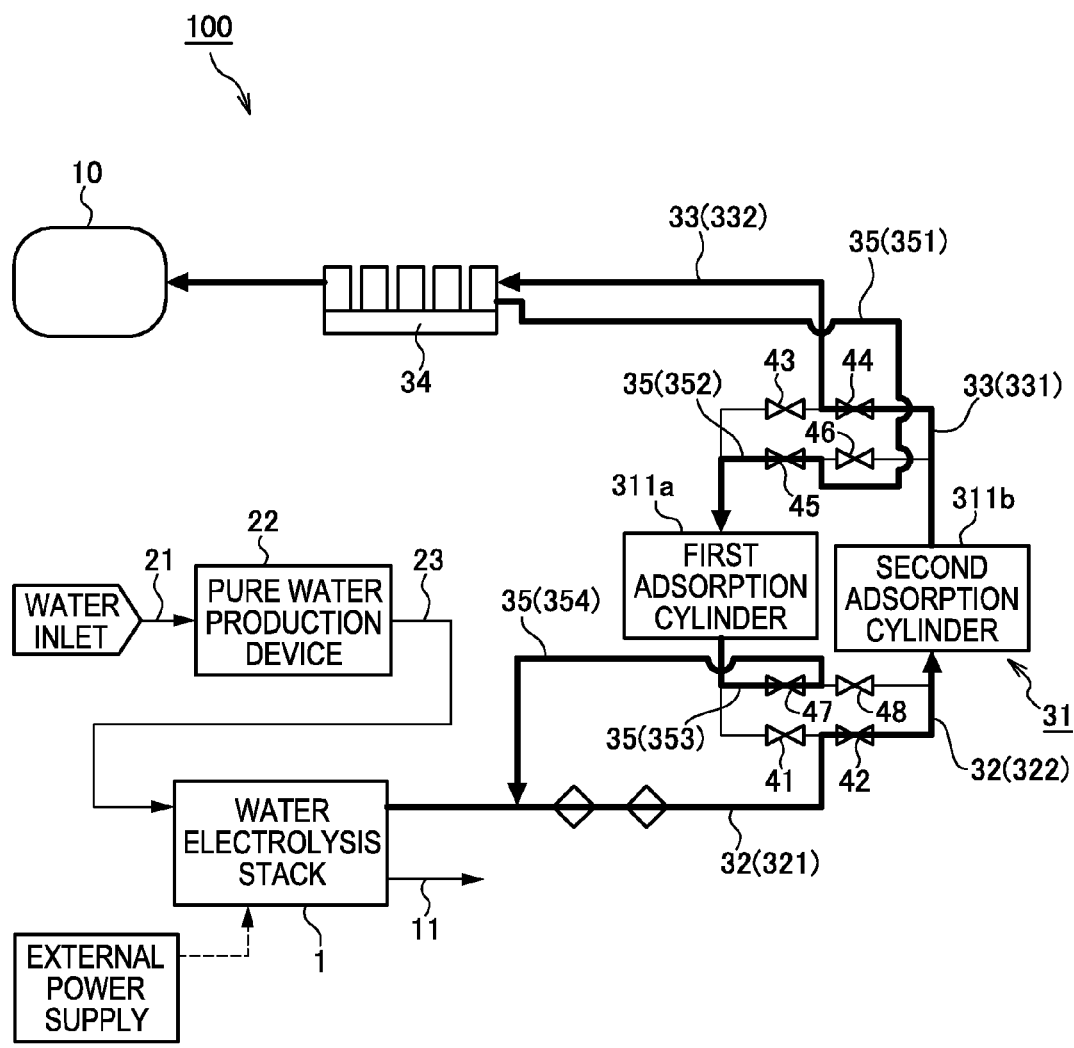
FIG. 3 is a drawing illustrating the flow of hydrogen when the moisture of the wet hydrogen is adsorbed by the second adsorption cylinder, and the first adsorption cylinder is renewed.

FIG. 3 is a drawing illustrating the flow of hydrogen when the moisture of the wet hydrogen is adsorbed by the second adsorption cylinder 311b, and the first adsorption cylinder 311a is renewed.

When the moisture of the wet hydrogen is adsorbed by the second adsorption cylinder 311b and the first adsorption cylinder 311a is renewed, as illustrated in FIG. 3, the first valve 41, the third valve 43, the sixth valve 46, and the eighth valve 48 are closed, and the second valve 42, the fourth valve 44, the fifth valve 45, and the seventh valve 47 are opened, contrary to the above. Thereby, the wet hydrogen is introduced into the second adsorption cylinder 311b, and the purge hydrogen, used for renewing the first adsorption cylinder 311a, can be returned to the wet hydrogen passage 321 and introduced into the second adsorption cylinder 311b again.

Thus, according to this embodiment, a part of the dry hydrogen whose pressure is temporarily increased in the compression device 34 is introduced, as the purge hydrogen, into the adsorption cylinder 311 that is being renewed, so that the pressure of the purge line 35 becomes higher than the pressure of the wet hydrogen passage 321, in consideration of a pressure loss of the adsorption cylinders 311 and the like.

Thereby, the purge hydrogen that is used for renewing the adsorption cylinders 311 can be returned to the wet hydrogen passage 321 again for circulation. As it is not necessary to discharge the purge hydrogen to the outside of the water electrolysis system 100, the hydrogen, generated in the water electrolysis stack 1 can be supplied to the hydrogen tank 10, without being wastefully disposed of.

The water electrolysis system 100 according to the above-described embodiment is provided with the water electrolysis stack 1 that electrolyzes water and generates hydrogen, the dehumidification device 31 that adsorbs and removes the moisture contained in the hydrogen generated by the water electrolysis stack 1, the wet line 32 that supplies the hydrogen generated by the water electrolysis stack 1 to the dehumidification device 31, the compression device 34 that gradually increases the pressure of the hydrogen whose moisture is removed in the dehumidification device 31, and the purge line 35 that takes out a part of the hydrogen whose pressure is being increased, in the compression device 34, allows it to pass through the dehumidification device 31, and allows it to join the wet line 32.

Thereby, a part of the hydrogen whose pressure is being increased, can be used to renew the dehumidification device 31, so that the energy loss can be reduced without increasing the pressure of the hydrogen more than necessary in order to renew the dehumidification device 31. In addition, the hydrogen used for the renewal can be returned via the purge line 35 to the wet line 32 for reuse, which makes it possible to prevent the hydrogen generated in the water electrolysis stack 1 from being discharged wastefully to the outside of the water electrolysis system 100.

Further, according to this embodiment, the purge hydrogen circulation passage 354 is connected to the wet hydrogen passage 321 at the position upstream of the auto drain 36. Namely, a part of the hydrogen whose pressure is increased in the compression device 34 is allowed to join the wet hydrogen passage 321 between the water electrolysis stack 1 and the auto drain 36.

The purge hydrogen flowing through the purge hydrogen circulation passage 354 contains the moisture that is heat-desorbed from the adsorption cylinder 311 that is being renewed. Therefore, when the purge hydrogen circulation passage 354 is connected to the wet hydrogen passage 321 at the position upstream of the auto drain 36, the moisture contained in the purge hydrogen can be discharged to the outside of the water electrolysis system 100 by the auto drain 36.

Furthermore, according to this embodiment, the dry hydrogen whose pressure is increased in the first-stage compressor of the compression device 34 is allowed to flow through the purge line 35 as the purge hydrogen.

Thus, the pressure of the purge hydrogen is not increased more than necessary, and hence no energy loss is caused. In addition, it is possible to reduce the thickness of the purge line 35, and to prevent the leakage of the purge hydrogen from the purge line 35.

The embodiment of the present invention has been explained thus far. However, the above-described embodiment is only a part of application examples of the present invention, and is not intended to limit the technical scope of the present invention to the concrete configuration of the above-described embodiment.

For example, in the above-described embodiment, the two adsorption cylinders 311 are provided in the dehumidification device 31. However, one or more adsorption cylinders 311 would suffice. When the two or more adsorption cylinders 311 are provided in the dehumidification device 31, as in the above-described embodiment, the water electrolysis system 100 can be operated even when one of the adsorption cylinders 311 is being renewed, by drying the wet hydrogen by the other adsorption cylinder 311 which is advantageous from the viewpoint of continuous operation.

Further, the temperature of the purge hydrogen flowing through the purge line 35 becomes relatively high, as its pressure is increased by the compression device 34, and it passes through the adsorption cylinders 311 that are heated by the heaters. Therefore, according to the above-described embodiment, the purge hydrogen flowing through the purge hydrogen circulation passage 354 is cooled (air cooled) by the air flowing on the surface of the purge hydrogen circulation passage 354, but may be cooled (water cooled) by, for example, water flowing through the water passage 21, or by performing heat exchange with water flowing through the pure water passage 23.

Furthermore, the water electrolysis system 100 as explained in the above-described embodiment can be mounted on mobile bodies such as vehicles that use hydrogen as fuel, and can be employed in stationary systems that use hydrogen as fuel.

Figure 4:
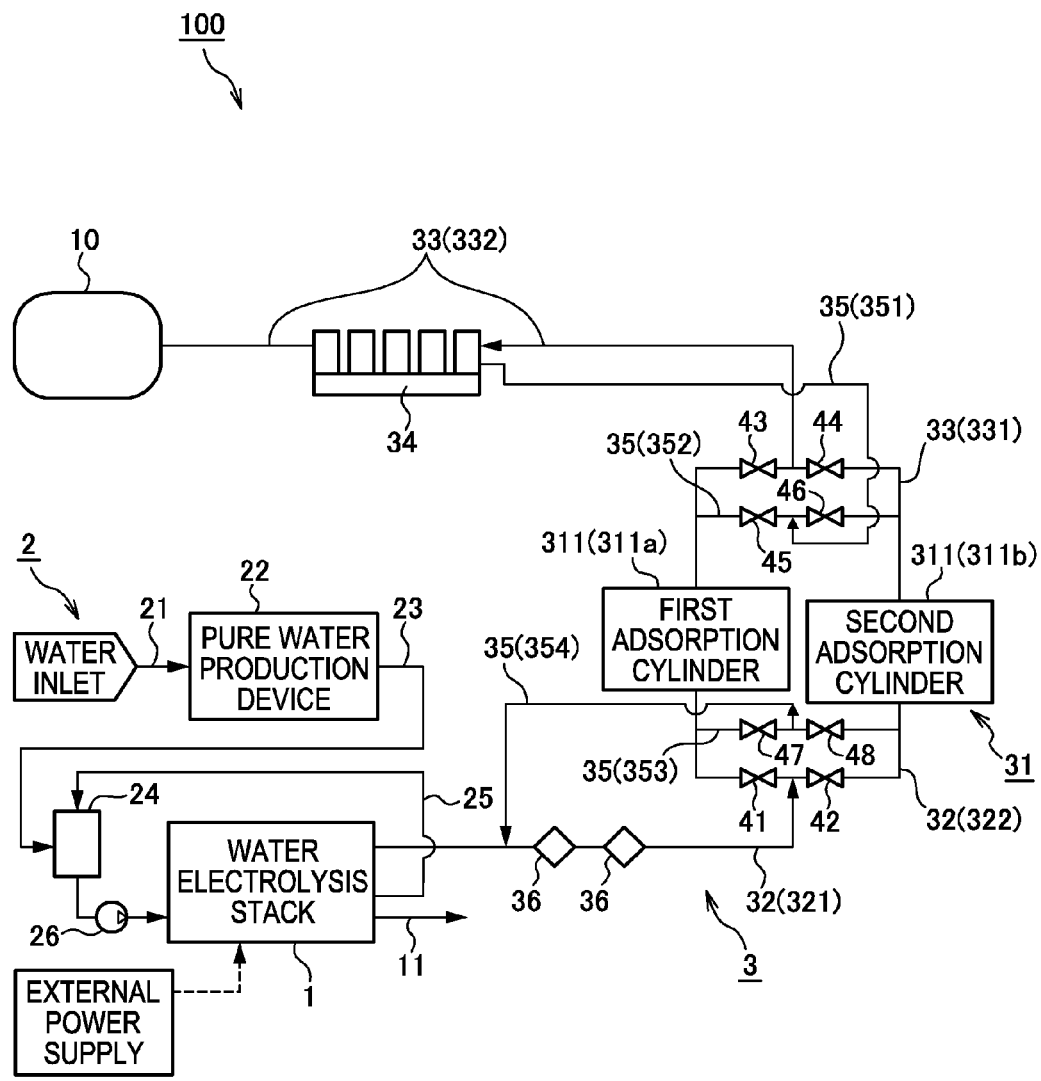
FIG. 4 is a schematic block diagram of the water electrolysis system according to another embodiment of the present invention.

Further, according to the above-described embodiment, the used pure water, used in the water electrolysis stack 1, is discharged to the outside. However, as illustrated in FIG. 4, a reservoir tank 24 for storing the pure water may be provided, for example, and the pure water, stored in the reservoir tank 24, may be circulated by a circulation pump 26 provided on the circulation passage 25. Then, only the oxygen generated in the water electrolysis stack 1 may be discharged from the discharge passage 11.

The present application claims priority to Japanese Patent Application No. 2012-142138 filed in the Japan Patent Office on June 25, 2012. The contents of this application are incorporated herein by reference in their entirety.

The invention claimed is:

1. A water electrolysis system, comprising:
    a water electrolysis stack configured to electrolyze water and generate hydrogen;
    a dehumidification device configured to adsorb and remove moisture contained in the hydrogen generated by the water electrolysis stack;
    a wet line configured to supply the hydrogen generated by the water electrolysis stack to the dehumidification device;
    a compression device configured to gradually increase pressure of the hydrogen whose moisture is removed in the dehumidification device; and
    a purge line configured to take out a part of the hydrogen whose pressure is being increased in the compression device, allowing the part of the hydrogen to pass through the dehumidification device, and returning the part of the hydrogen to the wet line, wherein
    a liquid discharge device is provided on the wet line and is configured to discharge liquid from the wet line, and
    the purge line allows the part of the hydrogen whose pressure is increased in the compression device to join the wet line between the water electrolysis stack and the liquid discharge device.

2. The water electrolysis system according to claim 1, wherein the pressure of the hydrogen that is taken out of the compression device is higher than pressure of the wet line.

3. The water electrolysis system according to claim 1, wherein the compression device comprises a multiple-stage compressor configured to increase pressure of the hydrogen whose moisture is removed in the dehumidification device, by dividing the hydrogen into at least two, and
    the purge line allows a part of the hydrogen whose pressure is increased in a first-stage compressor, to join the wet line.

4. The water electrolysis system according to claim 1, wherein the water electrolysis system is mounted on a vehicle that travels by using hydrogen as fuel.

5. The water electrolysis system according to claim 1, further comprising a circulation passage through which a coolant, used for electrolysis in the water electrolysis stack, circulates.

6. The water electrolysis system according to claim 1, wherein the dehumidification device comprises a first absorber and a second absorber, the purge line configured to feed the hydrogen whose pressure is being increased in the compression device to a selected one of the first absorber and the second absorber to renew the absorber, the part of the hydrogen to pass through the dehumidification device returned to the wet line and reintroduced to the dehumidification device.

* * * * *